US012804466B2

(12) United States Patent
Min et al.

(10) Patent No.: US 12,804,466 B2
(45) Date of Patent: Nov. 17, 2026

(54) METHOD FOR DETERMINING LINK OF HUB DEVICE FOR WIRELESS COMMUNICATION, AND ELECTRONIC DEVICE FOR PERFORMING SAME METHOD

(71) Applicant: Samsung Electronics Co., Ltd., Suwon-si (KR)

(72) Inventors: Hyunkee Min, Suwon-si (KR); Ashish Gupta, Suwon-si (KR); Taeyong Kim, Suwon-si (KR); Yeji Yoon, Suwon-si (KR); Junghun Lee, Suwon-si (KR); Junyeop Jung, Suwon-si (KR); Seongsu Choi, Suwon-si (KR); Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 18/660,646

(22) Filed: May 10, 2024

(65) Prior Publication Data

US 2024/0292273 A1 Aug. 29, 2024

Related U.S. Application Data

(63) Continuation of application No. PCT/KR2022/015230, filed on Oct. 9, 2022.

(30) Foreign Application Priority Data

Dec. 14, 2021 (KR) ........................ 10-2021-0178385

(51) Int. Cl.
*H04W 28/08* (2023.01)
*H04W 28/02* (2009.01)

(52) U.S. Cl.
CPC ... *H04W 28/0942* (2020.05); *H04W 28/0221* (2013.01)

(58) Field of Classification Search
None
See application file for complete search history.

(56) References Cited

U.S. PATENT DOCUMENTS

| | | | |
|---|---|---|---|
| 7,796,545 B2 | 9/2010 | Surineni et al. |
| 8,089,939 B1 | 1/2012 | Mater et al. |

(Continued)

FOREIGN PATENT DOCUMENTS

| | | |
|---|---|---|
| CN | 112492581 A | 3/2021 |
| CN | 112492643 A | 3/2021 |

(Continued)

OTHER PUBLICATIONS

European Search Report dated Dec. 23, 2024, issued in European Application No. 22907646.8.

(Continued)

*Primary Examiner* — Steve R Young
(74) *Attorney, Agent, or Firm* — Jefferson IP Law, LLP

(57) ABSTRACT

An electronic device and a method performed by the electronic device are provided. The method includes receiving a management frame for each of one or more links transmitted by at least one hub device, determining a predicted downlink (DL) throughput and a predicted uplink (UL) throughput for each of the links based on the management frame, determining a target link based on the determined predicted DL throughput and the predicted UL throughput for each of the links, and exchanging data with an external electronic device through the target link.

18 Claims, 15 Drawing Sheets

(56) References Cited

U.S. PATENT DOCUMENTS

| | | | | |
|---|---|---|---|---|
| 9,763,159 | B2 | 9/2017 | Sang et al. | |
| 2006/0209763 | A1 | 9/2006 | Emeott et al. | |
| 2007/0161364 | A1 | 7/2007 | Surineni et al. | |
| 2011/0286418 | A1* | 11/2011 | Liu | H04L 45/125 370/329 |
| 2014/0126388 | A1* | 5/2014 | Shin | H04W 48/20 370/252 |
| 2015/0288599 | A1* | 10/2015 | Zhou | H04L 45/70 370/338 |
| 2015/0312831 | A1 | 10/2015 | Sang et al. | |
| 2020/0163141 | A1 | 5/2020 | Hsu et al. | |
| 2020/0374810 | A1* | 11/2020 | Hart | H04W 24/10 |
| 2021/0184702 | A1* | 6/2021 | Sandoval | H04L 45/124 |
| 2021/0289512 | A1 | 9/2021 | Hu | |
| 2021/0329500 | A1 | 10/2021 | Cariou et al. | |
| 2022/0210767 | A1* | 6/2022 | Yang | H04W 72/542 |
| 2022/0353933 | A1* | 11/2022 | Smith | H04W 84/12 |
| 2023/0156840 | A1* | 5/2023 | Chitrakar | H04W 76/14 370/329 |
| 2024/0406880 | A1* | 12/2024 | Lee | H04W 52/32 |

FOREIGN PATENT DOCUMENTS

| | | | |
|---|---|---|---|
| JP | 2008-535398 | A | 8/2008 |
| JP | 4754624 | B2 | 8/2011 |
| WO | 2020/231661 | A1 | 11/2020 |
| WO | 2021/183045 | A1 | 9/2021 |

OTHER PUBLICATIONS

International Search Report dated Jun. 22, 2023, issued in International Patent Application No. PCT/KR2022/015230.

Yongho Seok etc., Multi-Link Operation Management, IEEE 802.11-19/1358r5, Nov. 1, 2020.

Guogang Huang etc., Discussion on Multi-link Setup, IEEE 802.11-20/1534r8, Jan. 26, 2021.

Abhishek Patil etc., Resolution for CIDs related to MLO Discovery (CC 34), IEEE 802.11-21/0650r8, Apr. 2021.

* cited by examiner

METHOD FOR DETERMINING LINK OF HUB DEVICE FOR WIRELESS COMMUNICATION, AND ELECTRONIC DEVICE FOR PERFORMING SAME METHOD

CROSS-REFERENCE TO RELATED APPLICATION(S)

This application is a continuation application, claiming priority under § 365(c), of an International application No. PCT/KR2022/015230, filed on Oct. 9, 2022, which is based on and claims the benefit of a Korean patent application number 10-2021-0178385, filed on Dec. 14, 2021, in the Korean Intellectual Property Office, the disclosure of which is incorporated by reference herein in its entirety.

BACKGROUND

1. Field

The disclosure relates to technology for determining a link for wireless communication from among links of a hub device based on various frequency bands.

2. Description of Related Art

A wireless local area network (WLAN) may be also referred to as a wireless local area network (LAN) or wireless fidelity (Wi-Fi) and may refer to a system for establishing a network environment from a hub to each terminal by using a wireless frequency or light instead of a wire cable in an outdoor environment or an indoor environment, which is limited to a space or a building, such as an office, a shopping center, or a house. The WLAN may not need wiring and may enable easy relocation of terminals, mobile communication, and network establishment in a short time. In addition, the WLAN is used for various services in various fields because the WLAN enables a large amount of data to be transmitted and received with a low transmission delay.

The above information is presented as background information only to assist with an understanding of the disclosure. No determination has been made, and no assertion is made, as to whether any of the above might be applicable as prior art with regard to the disclosure.

SUMMARY

An electronic device uses a wireless local area network (WLAN) that is provided by a hub device, such as an access point (AP), to exchange data with an external device, such as a server. Recently, the hub device provides a WLAN based on 2.4 gigahertz (GHz), 5 GHZ, and 6 GHz frequency bands. One or more hub devices located around the electronic device provides the electronic device with various wireless communication links based on various frequency bands. As each link exhibits different performance levels, the electronic device needs to determine a suitable link for wireless communication.

An embodiment is to address at least the above-mentioned problems and/or disadvantages and to provide at least the advantages described below. Accordingly, an embodiment of the disclosure is to provide an electronic device for exchanging data with an external device through a link determined from among a plurality of wireless communication links.

However, the technical goals are not limited to the foregoing goals, and there may be other technical goals.

According to an embodiment, an electronic device is provided. The electronic device includes a communication module configured to exchange data with an external device, memory storing one or more computer programs, at least one processor, and memory storing instructions that, when executed by the at least one processor individually and/or collectively, cause the electronic device to receive a management frame for each of one or more links transmitted by at least one hub device using the communication module, determine a predicted downlink (DL) throughput and a predicted uplink (UL) throughput for each of the links based on the management frame, determine a target link based on the determined predicted DL throughput and predicted UL throughput for each of the links, and exchange data using an external device through the target link using the communication module.

According to an embodiment, a method, performed by an electronic device, is provided. The method includes receiving a management frame for each of one or more links transmitted by at least one hub device, determining a predicted DL throughput and a predicted UL throughput for each of the links based on the management frame, determining a target link based on the determined predicted DL throughput and the predicted UL throughput for each of the links, and exchanging data with an external electronic device through the target link.

According to various embodiments of the disclosure, an electronic device for exchanging data with an external device through a link determined from among a plurality of wireless communication links is provided.

In accordance with another aspect of the disclosure, an electronic device is provided. The electronic device includes a communication module configured to exchange data with an external device, memory storing one or more computer programs, and one or more processors communicatively coupled to the communication module and the memory, wherein the one or more computer programs include computer-executable instructions that, when executed by the one or more processors, cause the electronic device to receive a management frame for each of a plurality of links transmitted by a plurality of hub devices using the communication module, determine a predicted downlink (DL) throughput and a predicted uplink (UL) throughput for each of the plurality of links based on the management frame, determine a target hub device from among the plurality of hub devices based on the determined predicted DL throughput and predicted UL throughput for each of the links, and exchange data with an external device through one or more links of the target hub device.

In accordance with another aspect of the disclosure, one or more non-transitory computer-readable storage media storing computer-executable instructions that, when executed by one or more processors of an electronic device, cause the electronic device to perform operations are provided. The operations include receiving a management frame for each of one or more links transmitted by at least one hub device, determining a predicted downlink (DL) throughput and a predicted uplink (UL) throughput for each of the links based on the management frame, determining a target link based on the determined predicted DL throughput and the predicted UL throughput for each of the links, and exchanging data with an external electronic device through the target link.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
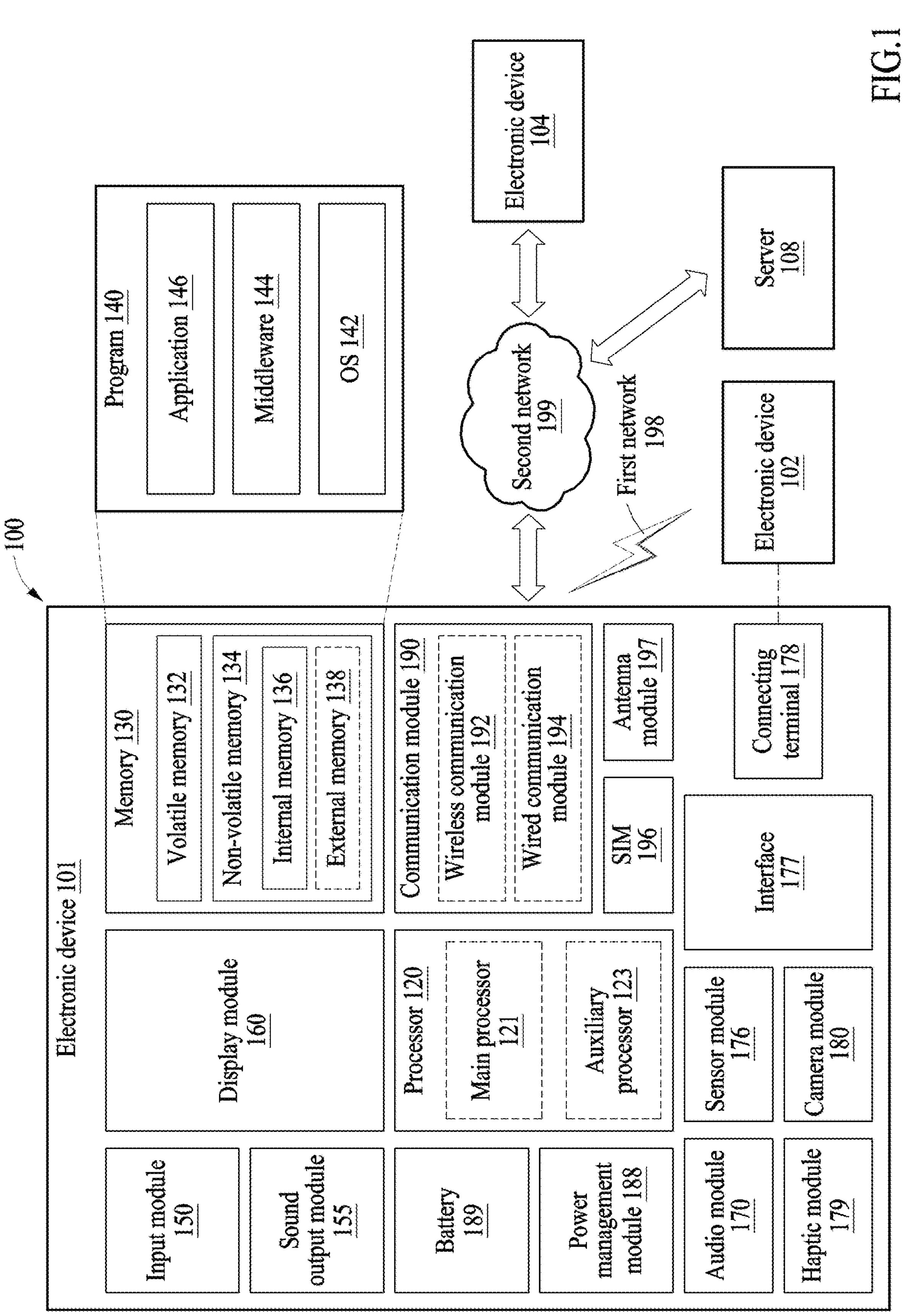
FIG. 1 is a block diagram of an electronic device in a network environment according to an embodiment of the disclosure.

FIG. 1 is a block diagram of an electronic device in a network environment according to an embodiment of the disclosure.

Referring to FIG. 1, it illustrates a block of an electronic device 101 in a network environment 100 according to various embodiments. Referring to FIG. 1, the electronic device 101 in the network environment 100 may communicate with an external electronic device 102 via a first network 198 (e.g., a short-range wireless communication network) or communicate with at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one (e.g., the connecting terminal 178) of the components may be omitted from the electronic device 101, or one or more other components may be added to the electronic device 101. In some embodiments of the disclosure, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120 and may perform various data processing or computation. According to an embodiment of the disclosure, as at least a portion of data processing or computations, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment of the disclosure, the auxiliary processor 123 (e.g., an ISP or a CP) may be implemented as a portion of another component (e.g., the camera module 180 or the communication module 190) that is functionally related to the auxiliary processor 123. According to an embodiment of the disclosure, the auxiliary processor 123 (e.g., an NPU) may include a hardware structure specified for artificial intelligence (AI) model processing. An AI model may be generated through machine learning. Such learning may be performed by, for example, the electronic device 101, in which an AI model is executed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto.

The AI model may additionally or alternatively include a software structure other than the hardware structure.

The memory 130 may store various pieces of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive, from the outside (e.g., a user) of the electronic device 101, a command or data to be used by another component (e.g., the processor 120) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a recording. The receiver may be used to receive an incoming call. According to an embodiment of the disclosure, the receiver may be implemented separately from the speaker or as a part of the speaker.

The display module 160 may visually provide information to the outside (e.g., a user) of the electronic device 101. The display module 160 may include, for example, a display, a hologram device, or a projector and a control circuit to control a corresponding one of the display, the hologram device, and the projector. According to an embodiment of the disclosure, the display module 160 may include a touch sensor adapted to detect a touch or a pressure sensor adapted to measure an intensity of a force incurred by the touch.

The audio module 170 may convert a sound into an electric signal or vice versa. According to an embodiment of the disclosure, the audio module 170 may obtain the sound via the input module 150 or output the sound via the sound output module 155 or an external electronic device (e.g., the external electronic device 102, such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101 and generate an electric signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., by wire) or wirelessly. According to an embodiment of the disclosure, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus, which may be recognized by a user via his or her tactile sensation or kinesthetic sensation. According to an embodiment of the disclosure, the haptic module 179 may include, for example, a motor, a piezoelectric element, or an electric stimulator.

The camera module 180 may capture a still image and moving images. According to an embodiment of the disclosure, the camera module 180 may include one or more lenses, image sensors, ISPs, or flashes.

The power management module 188 may manage power supplied to the electronic device 101. According to an embodiment of the disclosure, the power management module 188 may be implemented as, for example, at least a part of a power management integrated circuit (PMIC).

The battery 189 may supply power to at least one component of the electronic device 101. According to an embodiment of the disclosure, the battery 189 may include, for example, a primary cell, which is not rechargeable, a secondary cell, which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., an AP) and that support direct (e.g., wired) communication or wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mm Wave) band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment of the disclosure, another component (e.g., a radio frequency integrated circuit (RFIC)) other than the radiating element may be additionally formed as a part of the antenna module 197.

According to an embodiment of the disclosure, the antenna module 197 may form a mm Wave antenna module. According to an embodiment of the disclosure, the mm Wave antenna module may include a PCB, an RFIC disposed on a first surface (e.g., a bottom surface) of the PCB or adjacent to the first surface and capable of supporting a designated a high-frequency band (e.g., the mm Wave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and exchange signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment of the disclosure, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer a result of the performance to the electronic device 101. The electronic device 101 may provide the result, with or without further processing the result, as at least part of a response to the request. To that end, cloud computing, distributed computing, mobile edge computing (MEC), or client-server computing technology may be used, for example. The electronic device 101 may provide ultra low-latency services using, e.g., distributed computing or MEC. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. Terms, such as "1st", "2"d", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments of the disclosure as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
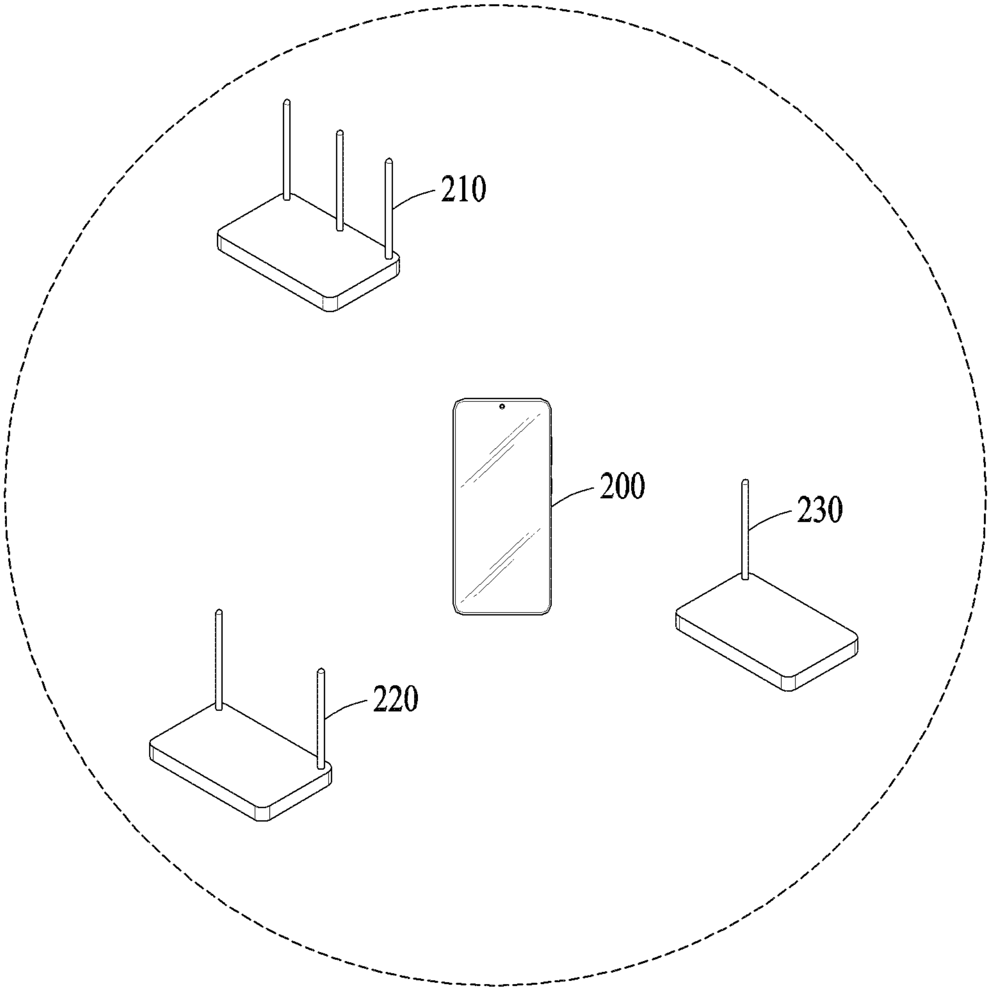
FIG. 2 illustrates a positional relationship between an electronic device and hub devices disposed on a plane according to an embodiment of the disclosure.

FIG. 2 illustrates a positional relationship between an electronic device and hub devices disposed on a plane according to an embodiment of the disclosure.

Referring to FIG. 2, an electronic device 200 (e.g., the electronic device 101 of FIG. 1) of FIG. 2 may scan channels in frequency bands used by hub devices (e.g., a first hub device 210, a second hub device 220, and a third hub device 230) around the electronic device 200 and identify the hub devices (e.g., the first hub device 210 to the third hub device 230). The electronic device 200, by using the scanned channels, may communicate with the hub devices (e.g., the first hub device 210 to the third hub device 230). For example, each of the hub devices (e.g., the first hub device 210 to the third hub device 230) may be an access point (AP) or an AP multi-link device (MLD) in which a device includes a plurality of APs.

In an embodiment of the disclosure, each of the hub devices (e.g., the first hub device 210 to the third hub device 230) may use channels in different frequency bands, and thus, the electronic device 200 may scan a plurality of channels to detect the hub devices (e.g., the first hub device 210 to the third hub device 230). For example, frequency bands used by the hub devices (e.g., the first hub device 210 to the third hub device 230) may include 2.4 gigahertz (GHz), 5 GHZ, and 6 GHz bands.

According to an embodiment of the disclosure, the first hub device 210 may be an AP MLD. An AP 1 of the first hub device 210 may support 2.4 GHZ, an AP 2 of the first hub device 210 may support 5 GHz, and an AP 3 of the first hub device 210 may support 6 GHZ. A first link (or a first channel), a second link (or a second channel), and a third link (or a third channel) may be established respectively through the AP 1, the AP 2, and the AP 3 of the first hub device 210, between the electronic device 200 and the first hub device 210. For example, each of the first link, the second link, and the third link may be a primary link and operate independently of an operation with another link. A technique in which each link operates independently of an operation with another link may be referred to as multi-link operation (MLO). The institute of electrical and electronic engineers (IEEE) 802.11be or wireless fidelity (Wi-Fi) 7 may support MLO in which a plurality of primary links is established between the electronic device 200 and the first hub device 210 as described above.

According to an embodiment of the disclosure, when the first hub device 210 supports MLO, the first hub device 210 may further support multi-link aggregation (MLA), which is a technique for aggregating a plurality of links to use these links as a single link. For example, the first link, the second link, and the third link between the electronic device 200 and the first hub device 210 may be treated as a single aggregated link. The aggregated link may be used as a DL and/or a UL.

Although the first hub device 210 is described as supporting both MLA and MLO, the first hub device 210 may not support MLA but may support MLO according to an embodiment.

According to an embodiment of the disclosure, the second hub device 220 may be an AP MLD. An AP 1 and an AP 2 of the second hub device 220 may support 5 GHz and 6 GHz, respectively. A fourth link (or a fourth channel) and a fifth link (or a fifth channel) may be established respectively through the AP 1 and the AP 2 of the second hub device 220, between the electronic device 200 and the second hub device 220. The description of the first hub device 210 may apply to the description of the second hub device 220, and thus, the description of the second hub device 220 is not repeated hereinafter.

According to an embodiment of the disclosure, the third hub device 230 may be a single AP, and the AP of the third hub device 230 may support one of the 2.4 GHz, 5 GHZ, and 6 GHz bands. A sixth link (or a sixth channel) may be established through the AP of the third hub device 230, between the electronic device 200 and the third hub device 230.

According to an embodiment of the disclosure provided with reference to FIG. 2, the electronic device 200 may select one of the hub devices (e.g., the first hub device 210 to the third hub device 230) as a target hub device and exchange data with the target hub device using one or more links between the electronic device 200 and the target hub device. The electronic device 200 may exchange data with an external device through the target hub device. For example, the external device may be a server, that is, a destination of data generated by an application executed by the electronic device 200, or a server that generates data requested by the application.

A method of determining a target link for exchanging data from among links between hub devices and an electronic device is described below with reference to FIGS. 5 to 13.

Figure 3A:
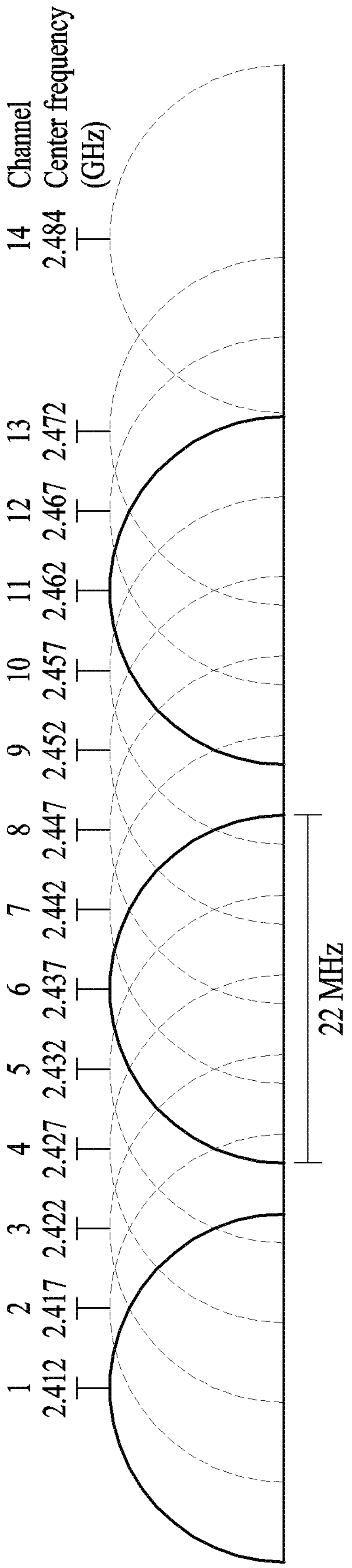
FIG. 3A illustrates channels in a 2.4 gigahertz (GHz) band according to an embodiment of the disclosure.

FIG. 3A illustrates channels in a 2.4 GHz band according to an embodiment of the disclosure.

Referring to FIG. 3A, according to an embodiment of the disclosure, 14 channels may be allocated to the 2.4 GHz band. Each of the channels in the 2.4 GHz band may have a 22 megahertz (MHz) bandwidth based on the center frequency of each of the channels. For example, channel 1 in the 2.4 GHz band may have a 22 MHz bandwidth with the center frequency of channel 1 being 2.412 MHz.

Active scanning may be performed on the channels in the 2.4 GHz band. The active scanning may include an electronic device propagating a probe request around the electronic device and the electronic device waiting to receive a probe response to the probe request.

Figure 3B:
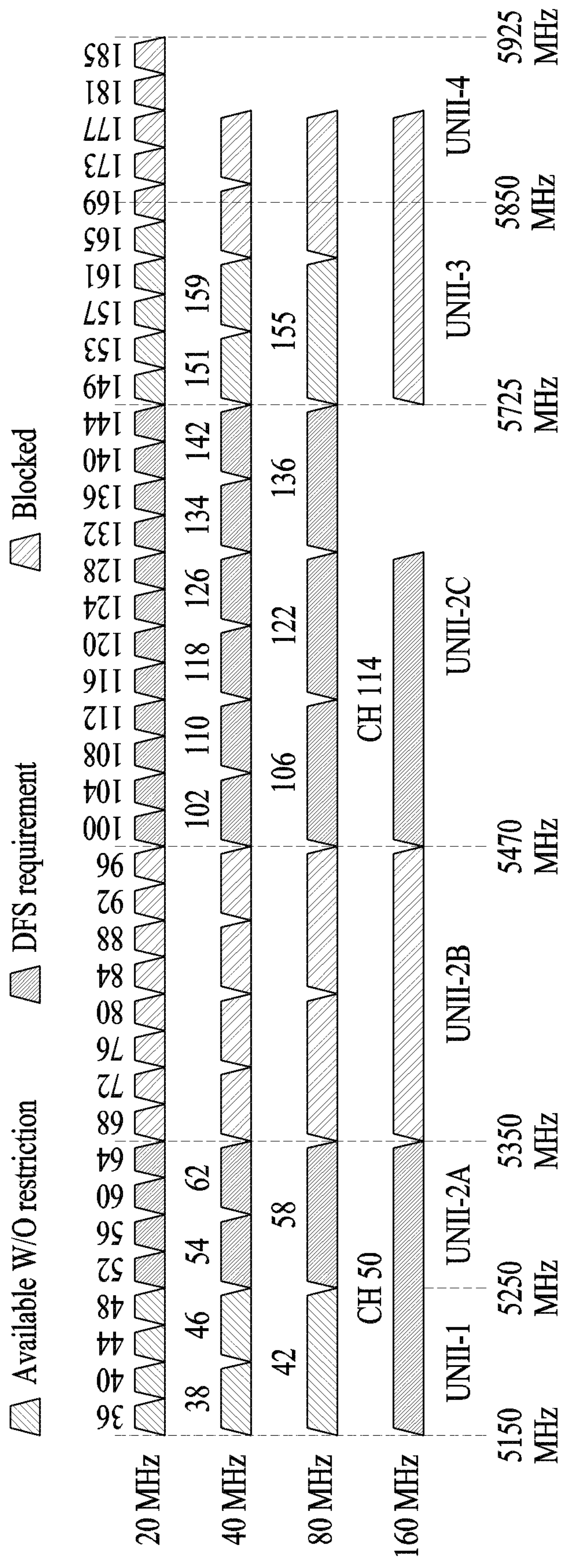
FIG. 3B illustrates channels in a 5 GHz band according to an embodiment of the disclosure.

FIG. 3B illustrates channels in a 5 GHz band according to an embodiment of the disclosure.

Referring to FIG. 3B, according to an embodiment of the disclosure, channels with 20 MHz, 40 MHz, 80 MHz, and 160 MHz bandwidths may be allocated to the 5 GHz band. The channels may be classified according to the purpose of use. For example, the channels may be a channel available without restriction, a dynamic frequency selection (DFS)-requiring channel, and a blocked channel. The DFS-requiring channel may be a channel not available for the purpose of general communication when the channel is used for a designated purpose, such as a military radar, satellite communication, or a weather radar, and may be a channel available for the purpose of general communication when it is verified that the channel is not used for the designated purpose.

In the 5 GHz band, active scanning may be performed on channels 36, 40, 44, 48, 149, 153, 157, 161, and 165, which are wireless local area network (WLAN) channels, and passive scanning may be performed on channels 52, 56, 60, 64, 100, 104, 108, 112, 116, 120, 124, 128, 132, 136, 140, and 144, which are DFS channels. The passive scanning may include an electronic device not propagating a probe request and the electronic device waiting to receive a beacon signal transmitted from a hub device.

Figure 3C:
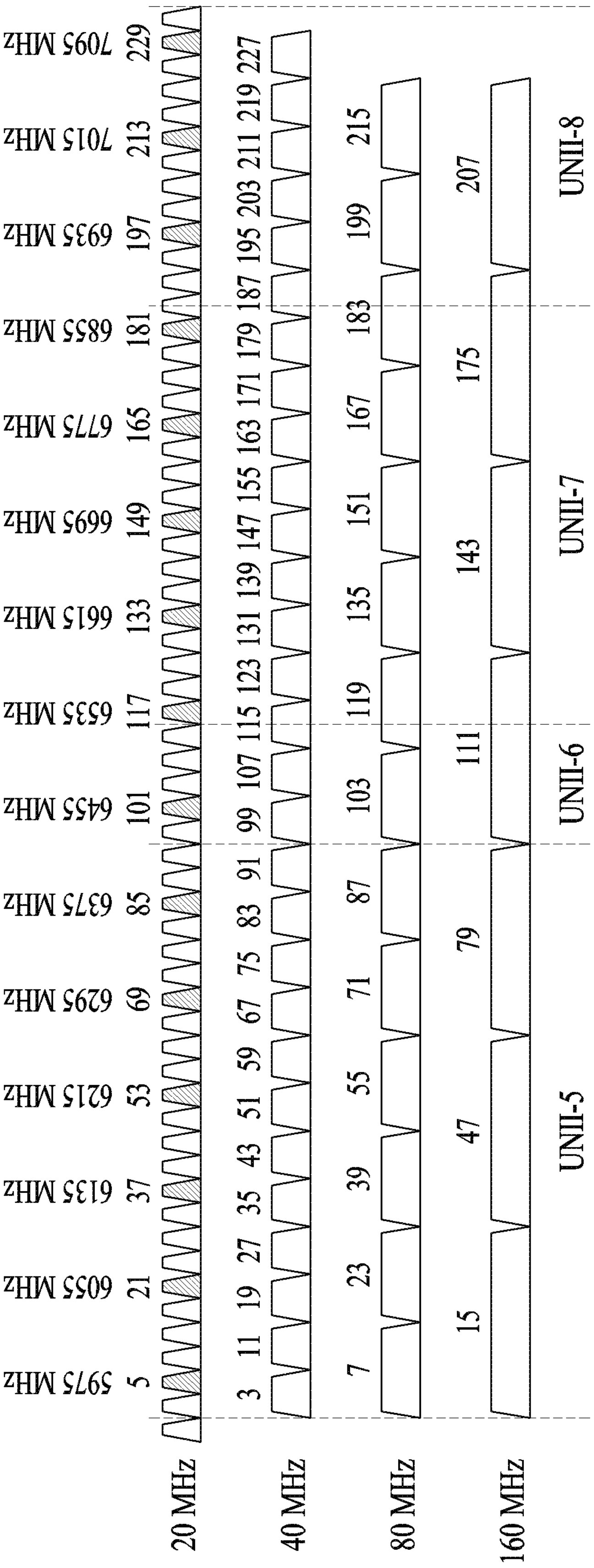
FIG. 3C illustrates channels in a 6 GHz band according to an embodiment of the disclosure.

FIG. 3C illustrates channels in a 6 GHz band according to an embodiment of the disclosure.

Referring to FIG. 3C, according to an embodiment of the disclosure, channels with 20 MHz, 40 MHz, 80 MHz, and 160 MHz bandwidths may be allocated to the 6 GHz band. For example, the 6 GHz band may include some (e.g., a band after 5925 MHz) of 5 GHz and some (e.g., a band before 7125 MHZ) of 7 GHz.

The channels with the 20 MHz bandwidth may be classified into a preferred scanning channel (PSC) or a non-PSC. The PSC may be a set of fifteen 20 MHz channels spaced apart from one another at an 80 MHz interval. For example, a hub device (e.g., the hub devices (e.g., the first hub device

210, the second hub device 220, and the third hub device 230) of FIG. 2) may match a default channel to the PSC such that the electronic device 200 may easily detect a channel. For example, the PSC may include channels 5, 21, 37, 53, 69, 85, 101, 117, 133, 149, 169, 181, 197, 213, and 229. The rest of the channels excluding the PSC may be a non-PSC.

Figure 4:
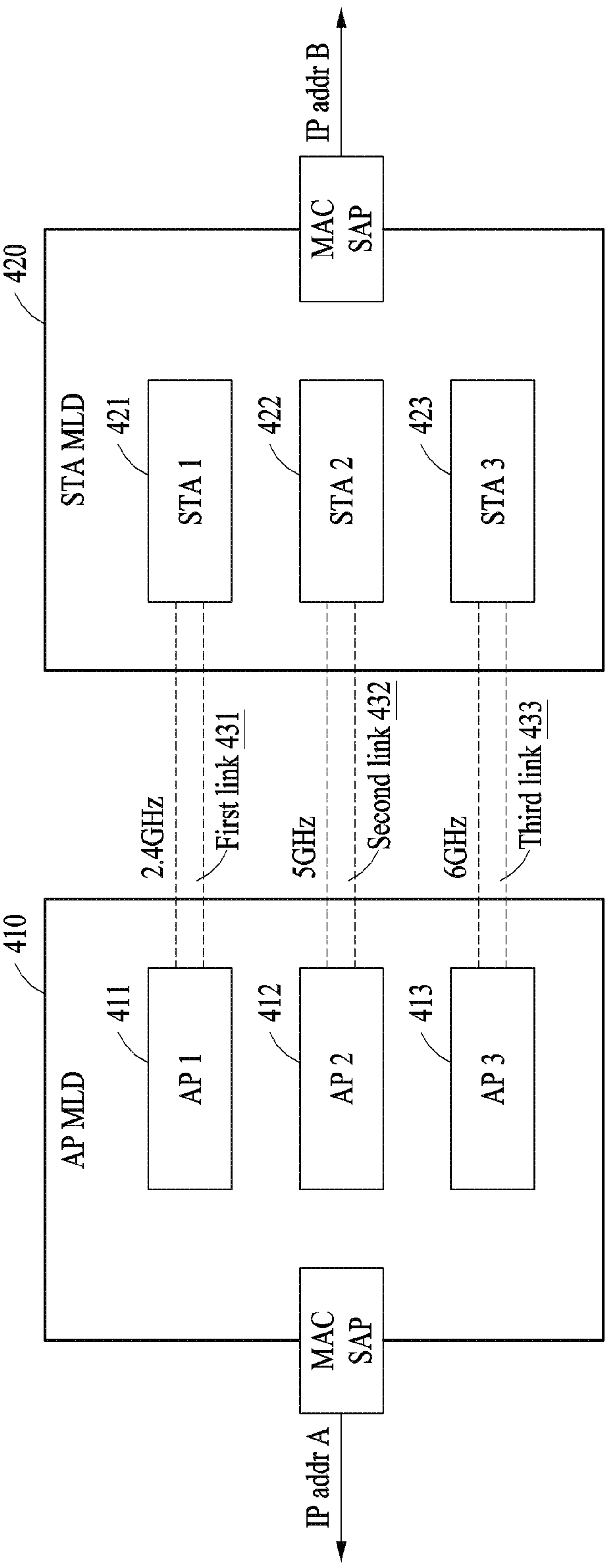
FIG. 4 illustrates a plurality of wireless communication links established between an electronic device and a hub device according to an embodiment of the disclosure.

FIG. 4 illustrates a plurality of wireless communication links established between an electronic device and a hub device according to an embodiment of the disclosure.

Referring to FIG. 4, according to an embodiment of the disclosure, wireless communication links including a first link 431, a second link 432, and a third link 433 may be established between a station (STA) MLD 420 (e.g., the electronic device 101 of FIG. 1 or the electronic device 200 of FIG. 2) and an AP MLD 410 (e.g., the first hub device 210 or the second hub device 220 of FIG. 2).

The AP MLD 410 may include a plurality of APs including an AP 1 411, an AP 2 412, and an AP 3 413, media access control (MAC) addresses of the AP MLD 410, the AP 1 411, the AP 2 412, and the AP 3 413 may be different from one another, and the MAC address of the AP MLD 410 may be a representative MAC address. For example, the AP 1 411 in the AP MLD 410 may support a 2.4 GHz band, the AP 2 412 in the AP MLD 410 may support a 5 GHz band, and the AP 3 413 in the AP MLD 410 may support a 6 GHz band. However, embodiments are not limited thereto. For example, the AP MLD 410 may have A as an Internet Protocol (IP) address.

The STA MLD 420 may include a plurality of STAs including an STA 1 421, an STA 2 422, and an STA 3 423, MAC addresses of the STA MLD 420, the STA 1 421, the STA 2 422, and the STA 3 423 may be different from one another, and the MAC address of the STA MLD 420 may be a representative MAC address. For example, the STA 1 421 in the STA MLD 420 may support the 2.4 GHz band, the STA 2 422 in the STA MLD 420 may support the 5 GHz band, and the STA 3 423 in the STA MLD 420 may support the 6 GHz band. However, embodiments are not limited thereto. For example, the STA MLD 420 may have B as an IP address.

The APs in the AP MLD 410 and the STAs in the STA MLD 420 may be physically configured as devices or logically configured.

Figure 5:
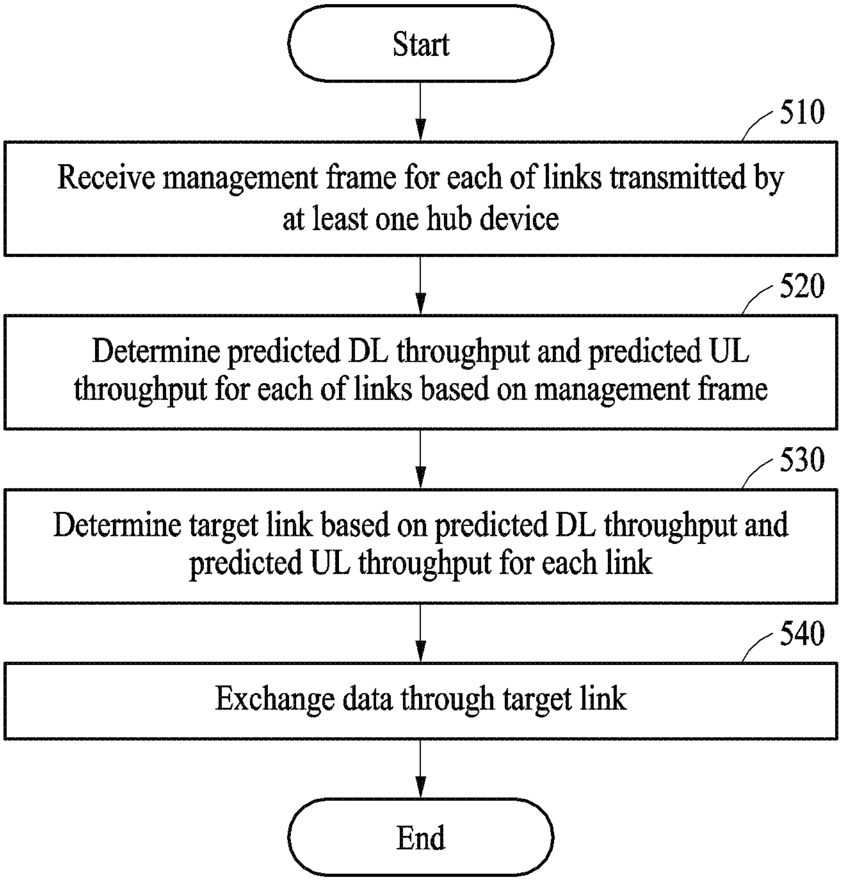
FIG. 5 is a flowchart of a method of exchanging data through a target link according to an embodiment of the disclosure.

FIG. 5 is a flowchart of a method of exchanging data through a target link according to an embodiment of the disclosure.

Referring to FIG. 5, according to an embodiment of the disclosure, operations 510 to 540 described below may be performed by an electronic device (e.g., the electronic device 101 of FIG. 1, the electronic device 200 of FIG. 2, or the STA MLD 420 of FIG. 4). The electronic device may include a communication module (e.g., the communication module 190 of FIG. 1) and a processor (e.g., the processor 120 of FIG. 1). For example, the electronic device may be one of a mobile communication terminal, a laptop, a personal computer (PC), a tablet terminal, or a wearable device.

In operation 510, the processor (e.g., the processor 120 of FIG. 1) of the electronic device may receive a management frame of each of links transmitted by at least one hub device (e.g., the first hub device 210, the second hub device 220, or the third hub device 230 of FIG. 2) using the communication module (e.g., the communication module 190 of FIG. 1). For example, the electronic device may receive a first management frame, a second management frame, and a third management frame for a first link, a second link, and a third link of the first hub device 210, respectively, receive a fourth management frame and a fifth management frame for a fourth link and a fifth link of the second hub device 220, respectively, and receive a sixth management frame for a sixth link of the third hub device 230. For example, a management frame may be a beacon or a probe response.

In operation 520, the processor of the electronic device may determine a predicted DL throughput and a predicted UL throughput for each of the links based on the received management frames. For example, a first predicted DL throughput and a first predicted UL throughput for the first link may be calculated based on the first management frame received from the first link. A method of calculating a predicted DL throughput and a predicted UL throughput for each link is described below with reference to FIG. 6.

According to an embodiment described with reference to FIG. 2, the electronic device (e.g., the electronic device 200) may calculate a predicted UL throughput and a predicted DL throughput for each of the first to seventh links of the hub devices (e.g., the first hub device 210 to the third hub device 230).

In operation 530, the processor of the electronic device may determine a target link, based on the predicted DL throughput and the predicted UL throughput for each link.

According to an embodiment of the disclosure, the target link may be one of links of a predetermined hub device. For example, the processor may determine, as the target link, a link with the greatest sum of the predicted DL throughput and the predicted UL throughput from among the links. In another example, the processor may determine a predicted throughput of a link, based on the predicted DL throughput and the predicted UL throughput of the link, and determine a link as a target link based on predicted throughputs of links. A method of determining a target link based on predicted throughputs of links is described below with reference to FIG. 7.

According to an embodiment of the disclosure, when a predetermined hub device supports MLA, the target link may be an aggregation of links of the predetermined hub device. A method of determining a predicted throughput of a hub device that supports MLA is described below with reference to FIG. 8.

According to an embodiment of the disclosure, when the predetermined hub device supports MLO, a UL and a DL among the links of the predetermined hub device may be determined as target links. A method of determining a predicted throughput of a hub device that supports MLO is described below with reference to FIG. 9.

In operation 540, the processor of the electronic device may exchange (e.g., transmit or receive) data with the hub device of the target link through the target link using the communication module.

The electronic device may exchange data with an external device through the hub device. For example, data generated by an application executed by the electronic device may be transmitted to the external device through the hub device. In another example, the electronic device may receive data requested by the application executed by the electronic device or data generated by the external device from the external device through the hub device.

Figure 6:
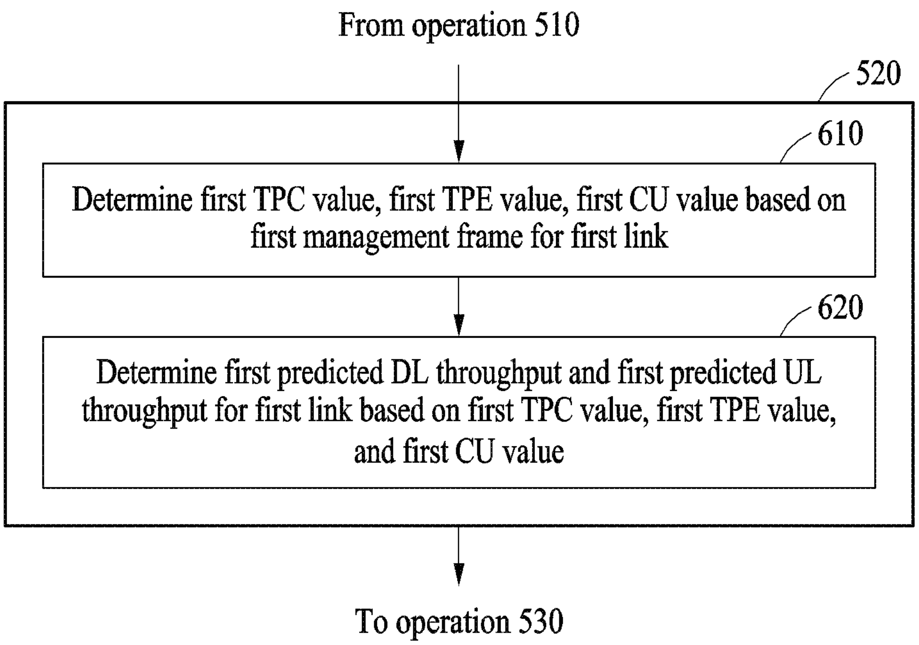
FIG. 6 is a flowchart of a method of determining a predicted downlink (DL) throughput and a predicted uplink (UL) throughput for a link of a hub device according to an embodiment of the disclosure.

FIG. 6 is a flowchart of a method of determining a predicted DL throughput and a predicted UL throughput for a link of a hub device according to an embodiment of the disclosure.

Referring to FIG. 6, according to an embodiment of the disclosure, operation 520 described above with reference to FIG. 5 may include operations 610 and 620 described below. Operations 610 and 620 may be performed by an electronic device (e.g., the electronic device 101 of FIG. 1, the electronic device 200 of FIG. 2, or the STA MLD 420 of FIG. 4).

In operation 610, a processor (e.g., the processor 120 of FIG. 1) of the electronic device may determine a first transmit power control (TPC) value, a first transmit power envelop (TPE) value, and a first channel utilization (CU) value based on a first management frame for a first link.

A TPC value may be obtained based on a TPC report element defined in IEEE 802.11. The format of the TPC report element may be shown below in Table 1.

TABLE 1

| | element ID | length | transmit power | link margin |
|---|---|---|---|---|
| octets: | 1 | 1 | 1 | 1 |

The element identification (ID) of the TPC report element is 35, and the hub device may insert the TPC report element into a management frame, such as a beacon, a probe response, and a TPC report frame. The electronic device may obtain transmit power information for a corresponding link based on the TPC report element.

The processor may calculate a path loss for the corresponding link, based on a DL received signal strength indication (RSSI) value measured for transmit power information and a management frame for each link. For example, the path loss for an i-th link may be calculated using Equation 1.

$$PL_i = RSSI_{DL,i} - TP_{DL,i} \quad \text{Equation 1}$$

In Equation 1, $PL_i$ may denote the path loss of the i-th link, $RSSI_{DL,i}$ may denote a DL RSSI value of the i-th link, and $TP_{DL,i}$ may denote transmit power of a hub device of the i-th link.

Table 2 and Table 3 below show a TPC report element and a TPE element in management frames received by the electronic device from a hub device (e.g., the second hub device 220 of FIG. 2) that supports both 5 GHz and 6 GHz. Table 2 may show an example of a TPC report element and a TPE element in a beacon as a management frame of a link in a 5 GHz band, and Table 3 may show an example of a TPC report element and a TPE element in a beacon of a link in a 6 GHz band.

TABLE 2

| TPC report element |
|---|
| Tag: TPC Report Transmit Power: 23, Link Margin: 0 |
| Tag Number: TPC Report (35) |
| Tag length: 2 |
| Transmit Power: 23 |
| Link Margin: 0 |
| Tag: RSN Information |
| Tag: QBSS load Element 802.11e CCA Version |
| Tag: AP Channel Report: Operation Class 134, Chanel List: 129, |
| Tag: RM Enabled Capabilities (5 octets) |
| Tag: Supported Operating Classes |
| Tag: HT Capabilities (802.11n D1.10) |
| Tag: HT Information (802.11n D1.10) |
| Tag: Extended Capabilities (10 octets) |
| Tag: VHT Capabilites |
| Tag: VHT Operation |
| **TPE element** |
| Tag: VHT Tx Power Envelop |
| Tag Number: VHT Tx Power Envelop (195) |
| Tag length: 4 |
| Tx Pwr Info: 0x02 |
| . . . 010 = Max Tx Pwr Count: 2 |
| . . . 00 0 . . . = Max Tx Pwr Unit Interpretation: EIRP (0) |
| 00 . . . = Reserved: 0 |
| Local Max Tx Pwr Constraint 20 MHz: 24.5 dBm |
| Local Max Tx Pwr Constraint 40 MHz: 24.5 dBm |
| Local Max Tx Pwr Constraint 80 MHz: 24.5 dBm |

TABLE 3

| TPC report element |
|---|
| Tag: TPC Report Transmit Power: 17, Link Margin: 0 |
| Tag Number: TPC Report (35) |
| Tag length: 2 |
| Transmit Power: 17 |
| Link Margin: 0 |
| Tag: RSN Information |
| Tag: QBSS load Element 802.11e CCA Version |
| Tag: Mutiple BSSID |
| Tag: Supported Operating Classes |
| Tag: Extended Capabilities (12 octets) |
| **TPE element** |
| Tag: VHT Tx Power Envelop |
| Tag Number: VHT Tx Power Envelop (195) |
| Tag length: 5 |
| Tx Pwr Info: 0x13 |
| Local Max Tx Pwr Constraint 20 MHz: 24.0 dBm |
| Local Max Tx Pwr Constraint 40 MHz: 24.0 dBm |
| Local Max Tx Pwr Constraint 80 MHz: 24.0 dBm |
| Local Max Tx Pwr Constraint 160 MHz/80 + 80 MHz: 24.0 dBm |
| Tag: VHT Tx Power Envelop |
| Tag Number: VHT Tx Power Envelop (195) |
| Tag length: 2 |
| Tx Pwr Info: 0x18 |
| Local Max Tx Pwr Constraint 20 MHz: −1.0 dBm |

The transmit power value of the TPC report element in Table 2 is 23 decibel-milliwatts (dBm), and the transmit power value of the TPC report element in Table 3 is 17 dBm. For example, when the DL RSSI value of the link in the 5 GHz band is-39 dBm and the DL RSSI value of the link in the 6 GHz band is-53 dBm, the path loss of the link in the 5 GHz band may be calculated as 23−(−39)-62 dBm and the path loss of the link in the 6 GHz band may be calculated as 17−(−53)=70 dBm. A TPE value may indicate maximum transmit power that the electronic device may use when the electronic device transmits a signal from a corresponding link to a hub device. In Table 2, the TPE value of the link in the 5 GHz may be determined to be 24.5 dBm. Table 3 shows an effective isotropic radiated power (EIRP) value and a power spectral density (PSD) value for the link in the 6 GHz band. The electronic device may determine, as the TPE value, the smaller value between the EIRP value and the PSD value. For example, when calculated with a 20 MHz bandwidth, the EIRP value is 24 dBm and the PSD value is 12 dBm/20 MHz. Therefore, the TPE value of the link in the 6 GHz band may be determined to be 12 dBm. According to an embodiment of the disclosure, the PSD value of the link in the 6 GHz band may be restricted based on standards determined by country codes.

When the TPE value of a predetermine link is determined, the electronic device may calculate (or estimate) a UL RSSI value based on the path loss and the TPE value calculated using Equation 1. The UL RSSI value may be calculated using Equation 2.

$$RSSI_{UL,i} = TP_{UL,i} - PL_i \quad \text{Equation 2}$$

In Equation 2, $RSSI_{UL,i}$ may denote the UL RSSI value of the i-th link, $PL_i$ may denote the path loss of the i-th link, and $TP_{UL,I}$ may denote the TPE value of a transmission device of the i-th link.

For example, when the TPE value of the link in the 5 GHz band is 17 dBm and the path loss of the link is 62 dBm, the UL RSSI value of the link may be calculated as −45 dBm.

For example, when the TPE value of the link in the 6 GHz band is 12 dBm and the path loss of the link is 70 dBm, the UL RSSI value of the link may be calculated as −58 dBm.

According to an embodiment of the disclosure, a basic service set (BSS) load element may be included in a management frame. The electronic device may obtain a centralized unit (CU) value based on the BSS load element.

In operation 620, the processor of the electronic device may determine a first predicted DL throughput and a first predicted UL throughput for the first link, based on the first TPC value, the first TPE value, and the first CU value of the first link.

According to an embodiment of the disclosure, the electronic device may calculate the occupancy rate of the electronic device (or another electronic device) for the link. The electronic device may calculate a throughput for the link, based on the data rate and the CU value of the link. For example, a data rate may be calculated using an equation for calculating a data rate described in the IEEE 802.11-2016 Annex R.7 Calculating Estimated Throughput part. The equation for calculating the data rate may be Equation 3 below.

$$\text{Data rate} = \min(\log_2(1+SNR_{tone}), MaxBitsPerSc)\times\frac{\text{NSS\_max}\times Ntone}{DSYM_{DUR}} \quad \text{Equation 3}$$

In Equation 3, $SNR_{tone}$ may be calculated by Equation 4 below, MaxBitsPerSc may denote the maximum number of bits that are transmitted per second, NSS_max may denote the maximum number of spatial streams allowed in a corresponding link, Ntone may denote the number of sub-carriers (or tones) used to transmit a symbol, and $DSYM_{DUR}$ may denote a symbol period.

$$SNR_{tone} = 10^{\frac{RSSI+P_{adjust}}{10}} \quad \text{Equation 4}$$

In Equation 4, $P_{adjust}$ may denote a power adjustment parameter used to convert an RSSI value to a signal-to-noise ratio (SNR) and may be determined by the electronic device. In other words, Equation 3 for calculating a data rate may be an equation for parameters and an RSSI value determined based on standards (e.g., IEEE 802.11a, b, g, n, ac, ax, or be) used for a connection with a hub device, and the data rate may be calculated based on the RSSI value. For example, when the RSSI value is a DL RSSI value, the calculated data rate may be a DL data rate and when the RSSI value is a UL RSSI value, the calculated data rate may be a UL data rate.

According to an embodiment of the disclosure, a predicated DL throughput and a predicted UL throughput of a corresponding link may be expressed as the product of the occupancy rate of the electronic device and the data rate. For example, the predicted DL throughput of the corresponding link may be calculated using Equation 5 and the predicted UL throughput of the corresponding link may be calculated using Equation 6.

$$ET_{DL,i} = DR_{DL,i}\times\frac{255-CU_i}{255} \quad \text{Equation 5}$$

In Equation 5, $ET_{DL,i}$ may denote a predicted DL throughput of the i-th link, $DR_{DL,i}$ may denote a DL data rate of the i-th link, and $CU_i$ may denote a CU value of the i-th link.

$$ET_{UL,i} = DR_{UL,i}\times\frac{255-CU_i}{255} \quad \text{Equation 6}$$

In Equation 6, $ET_{UL,i}$ may denote a predicted UL throughput of the i-th link, $DR_{UL,i}$ may denote a UL data rate of the i-th link, and $CU_i$ may denote a CU value of the i-th link.

Figure 7:
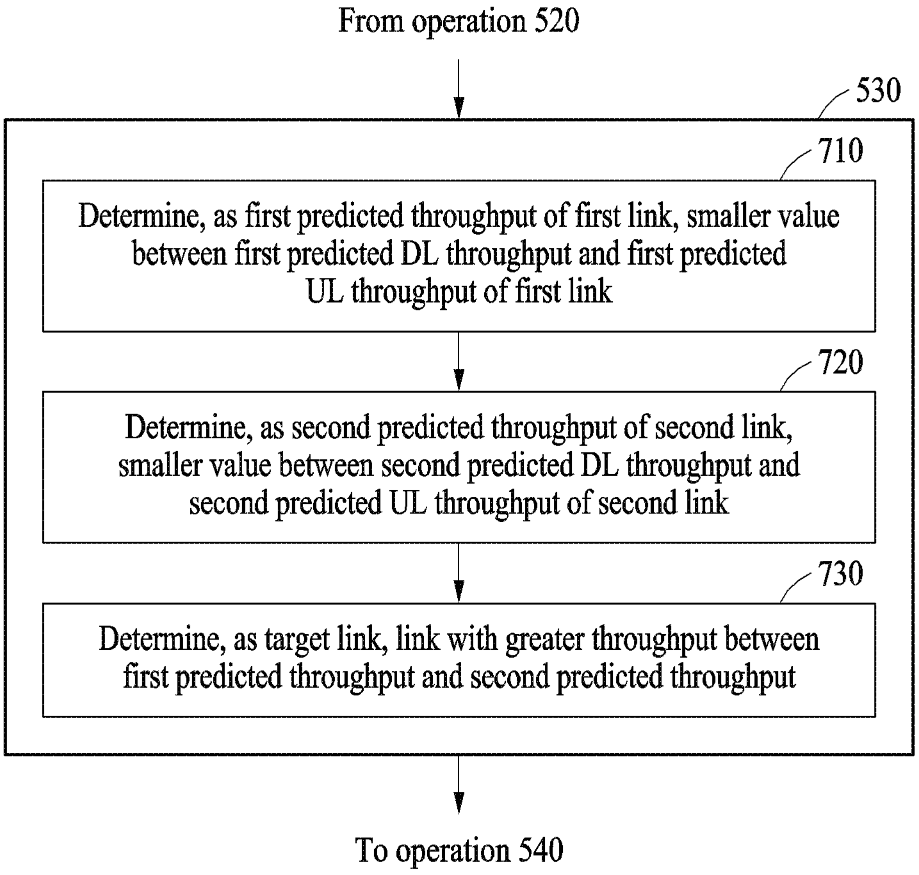
FIG. 7 is a flowchart of a method of determining a target link from among links based on a predicted throughput of a link according to an embodiment of the disclosure.

FIG. 7 is a flowchart of a method of determining a target link from among links based on a predicted throughput of a link according to an embodiment of the disclosure.

Referring to FIG. 7, according to an embodiment of the disclosure, operation 530 described above with reference to FIG. 5 may include operations 710 to 730 described below. Operations 710 to 730 may be performed by an electronic device (e.g., the electronic device 101 of FIG. 1, the electronic device 200 of FIG. 2, or the STA MLD 420 of FIG. 4).

In operation 710, a processor (e.g., the processor 120 of FIG. 1) of the electronic device may determine, as a first predicted throughput of a first link, the smaller value between a first predicted DL throughput and a first predicted UL throughput of the first link.

In operation 720, the processor of the electronic device may determine, as a second predicted throughput of a second link, the smaller value between a second predicted DL throughput and a second predicted UL throughput of the second link. For example, the first link and the second link may be links of the same hub device (e.g., the first hub device 210, the second hub device 220, or the third hub device 230 of FIG. 2). In another example, the first link and the second link may be respective links of different hub devices (e.g., the first hub device 210, the second hub device 220, and the third hub device 230 of FIG. 2).

In operation 730, the processor of the electronic device may determine, as a target link, a link with the greater value between the first predicted throughput and the second predicted throughput. A hub device including the target link may be a target hub device.

Figure 8:
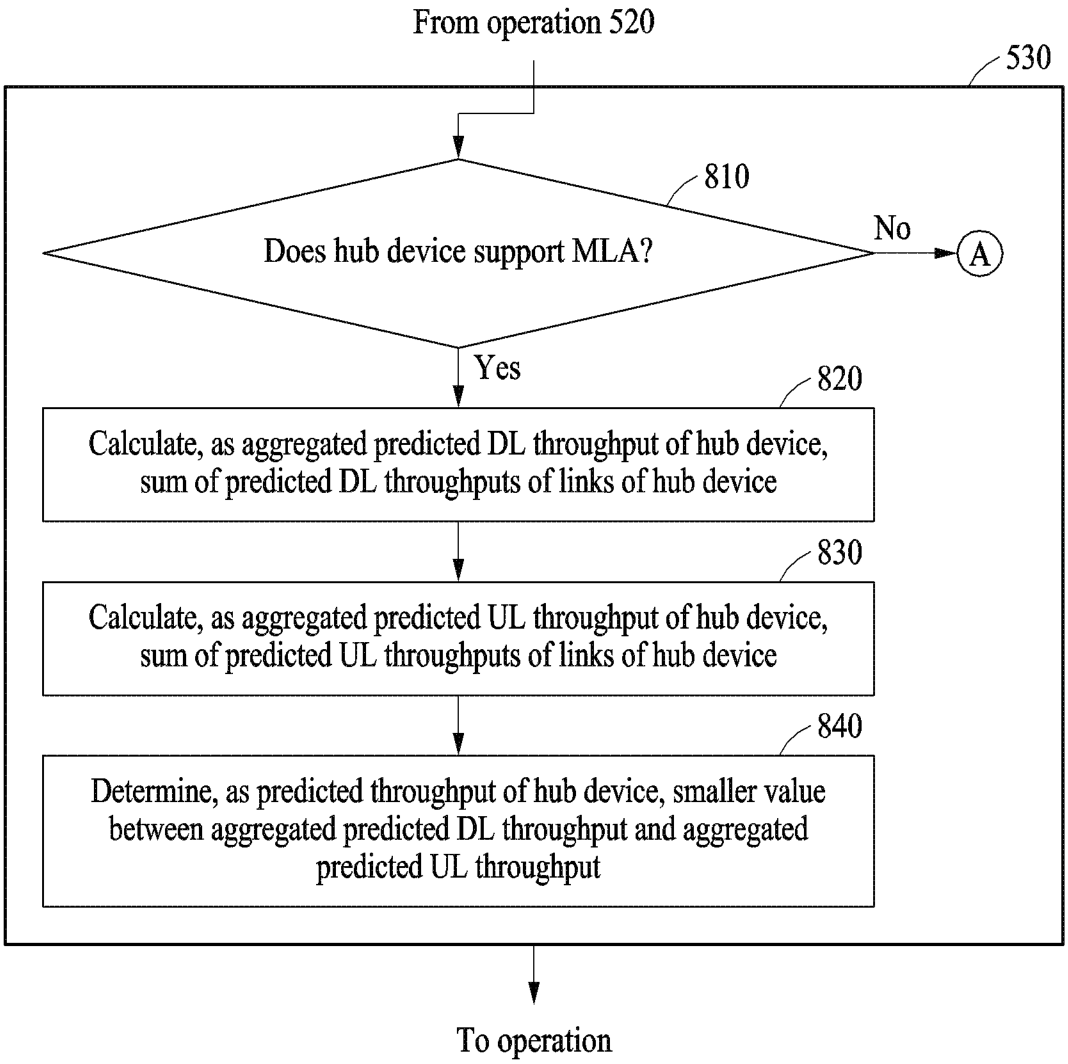
FIG. 8 is a flowchart of a method of determining a predicted throughput of a hub device when the hub device supports multi-link aggregation (MLA) according to an embodiment of the disclosure.

FIG. 8 is a flowchart of a method of determining a predicted throughput of a hub device when the hub device supports MLA according to an embodiment of the disclosure.

Referring to FIG. 8, according to an embodiment of the disclosure, operation 530 described above with reference to FIG. 5 may include operations 810 to 840 described below. Operations 810 to 840 may be performed by an electronic device (e.g., the electronic device 101 of FIG. 1, the electronic device 200 of FIG. 2, or the STA MLD 420 of FIG. 4).

In operation 810, a processor (e.g., the processor 120 of FIG. 1) of the electronic device may determine whether a hub device (e.g., the first hub device 210, the second hub device 220, or the third hub device 230 of FIG. 2) supports MLA.

According to an embodiment of the disclosure, when it is determined that the hub device does not support MLA, operations described with reference to FIG. 9 may be performed.

In operation 820, when the hub device supports MLA, the processor of the electronic device may calculate, as an aggregated predicted DL throughput of the hub device, the sum of predicted DL throughputs of links of the hub device.

For example, when the first hub device 210 supports MLA, the sum of predicted DL throughputs of the first link, the second link, and the third link of the first hub device 210 may be calculated as the aggregated predicted DL throughput of the first hub device 210.

In operation 830, when the hub device supports MLA, the processor of the electronic device may calculate, as an aggregated predicted UL throughput of the hub device, the sum of predicted UL throughputs of the links of the hub device. For example, when the first hub device 210 supports MLA, the sum of predicted UL throughputs of the first link, the second link, and the third link of the first hub device 210 may be calculated as the aggregated predicted UL throughput of the first hub device 210.

In operation 840, the processor of the electronic device may determine, as the predicted throughput of the hub device, the smaller value between the aggregated predicted DL throughput and the aggregated predicted UL throughput of the hub device that supports MLA.

According to an embodiment of the disclosure, the links of the hub device that supports MLA may be regarded as a single link. For example, the links of the hub device that supports MLA may be referred to as an aggregated link. The processor of the electronic device may determine, as a target link, the hub device itself, which supports MLA, or the aggregated link of the hub device.

Although the processor determines, as the predicted throughput of the hub device, the smaller value between the aggregated predicted DL throughput and the aggregated predicted UL throughput of the hub device that supports MLA in operation 840 according to an embodiment of the disclosure, the processor may determine, as the predicted throughput of the hub device, the greater value between the aggregated predicted DL throughput and the aggregated predicted UL throughput of the hub device that supports MLA after operation 830 is performed according to another embodiment.

Figure 9:
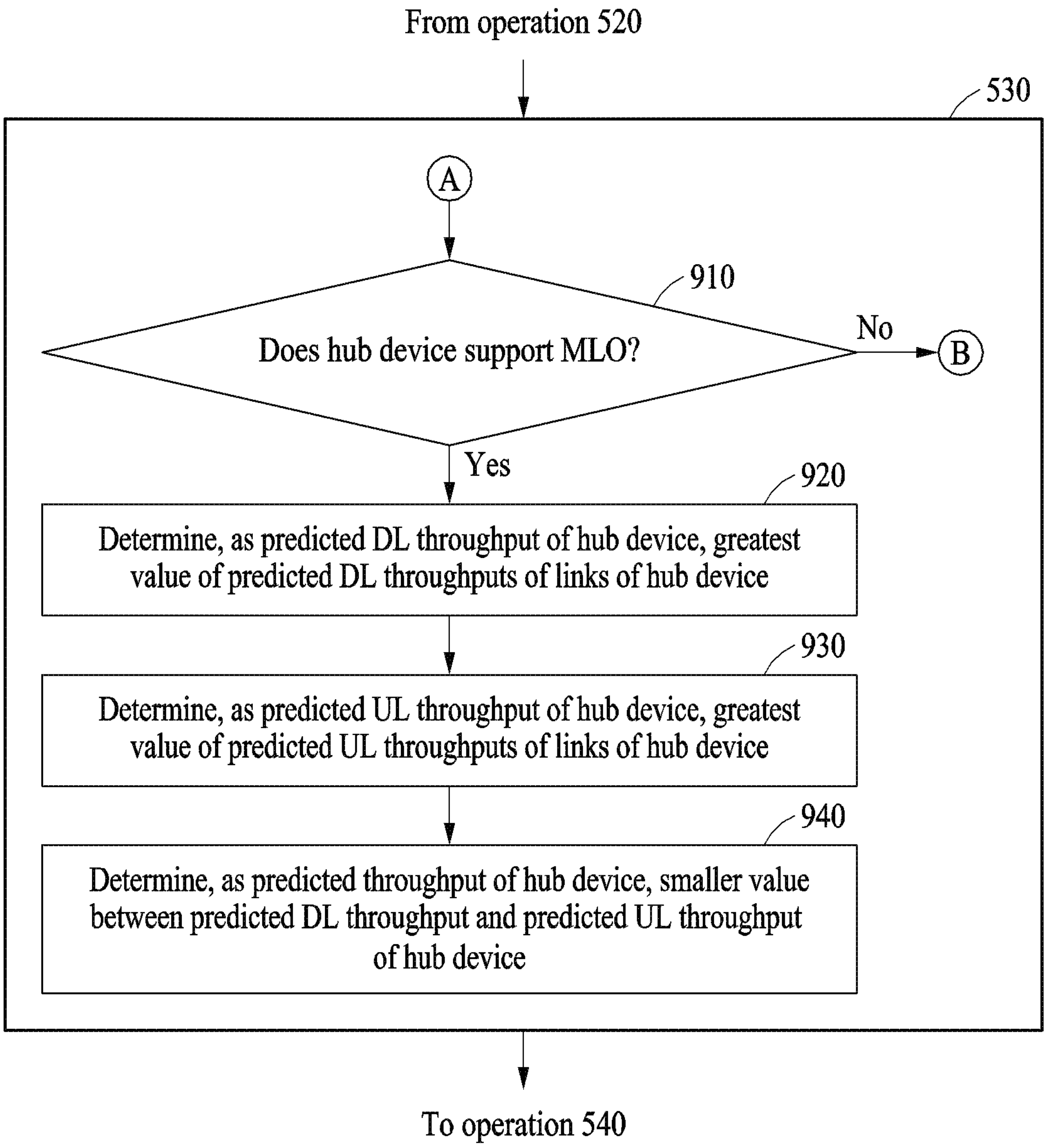
FIG. 9 is a flowchart of a method of determining a predicted throughput of a hub device when the hub device supports multi-link operation (MLO) according to an embodiment of the disclosure.

FIG. 9 is a flowchart of a method of determining a predicted throughput of a hub device when the hub device supports MLO according to an embodiment of the disclosure.

Referring to FIG. 9, according to an embodiment of the disclosure, operation 530 described above with reference to FIG. 5 may include operations 910 to 940 described below. Operations 910 to 940 may be performed by an electronic device (e.g., the electronic device 101 of FIG. 1, the electronic device 200 of FIG. 2, or the STA MLD 420 of FIG. 4). For example, operation 910 may be performed when it is determined that the hub device does not support MLA in operation 810 described above with reference to FIG. 8.

In operation 910, a processor (e.g., the processor 120 of FIG. 1) of the electronic device may determine whether a hub device (e.g., the first hub device 210, the second hub device 220, or the third hub device 230 of FIG. 2) supports MLO.

According to an embodiment of the disclosure, when it is determined that the hub device does not support MLO, operations described with reference to FIG. 10 may be performed.

In operation 920, when the hub device supports MLO, the processor of the electronic device may determine, as an aggregated predicted DL throughput of the hub device, the greater value of predicted DL throughputs of links of the hub device. In other words, when the hub device does not support MLA but supports MLO, operation 920 may be performed. For example, when the second hub device 220 does not support MLA but supports MLO, the greatest value of predicted DL throughputs of the fourth link and the fifth link of the second hub device 220 may be determined as a predicted DL throughput of the second hub device 220.

In operation 930, when the hub device supports MLO, the processor of the electronic device may determine, as a predicted UL throughput of the hub device, the greatest value of predicted UL throughputs of the links of the hub device. In the example of operation 920, the greatest value of predicted UL throughputs of the fourth link and the fifth link of the second hub device 220 may be determined as a predicted UL throughput of the second hub device 220.

In operation 940, the processor of the electronic device may determine, as a predicted throughput of the hub device, the smaller value between the predicted DL throughput and the predicted UL throughput of the hub device that supports MLO.

According to an embodiment of the disclosure, the processor of the electronic device may determine the hub device as a target hub device based on the predicted throughput of the hub device and determine a target link based on links of the target hub device. When the target hub device supports MLO, the target link may include a UL and a DL. A method of determining a UL and a DL when a target hub device supports MLO is described below with reference to FIG. 11.

According to an embodiment of the disclosure, each of the links of the hub device that supports MLO may be a primary link, and each of the links may operate independently of an operation with another link. IEEE 802.11be or Wi-Fi 7 may support a technique in which a plurality of primary links is established between the electronic device (e.g., the electronic device 200) and the hub device (e.g., the second hub device 220) that supports MLO as described above.

Although the processor determines, as the predicted throughput of the hub device, the smaller value between the predicted DL throughput and the predicted UL throughput of the hub device that supports MLO in operation 940 according to an embodiment of the disclosure, the processor may determine, as the predicted throughput of the hub device, the greater value between the predicted DL throughput and the predicted UL throughput of the hub device that supports MLO after operation 930 is performed according to another embodiment.

Figure 10:
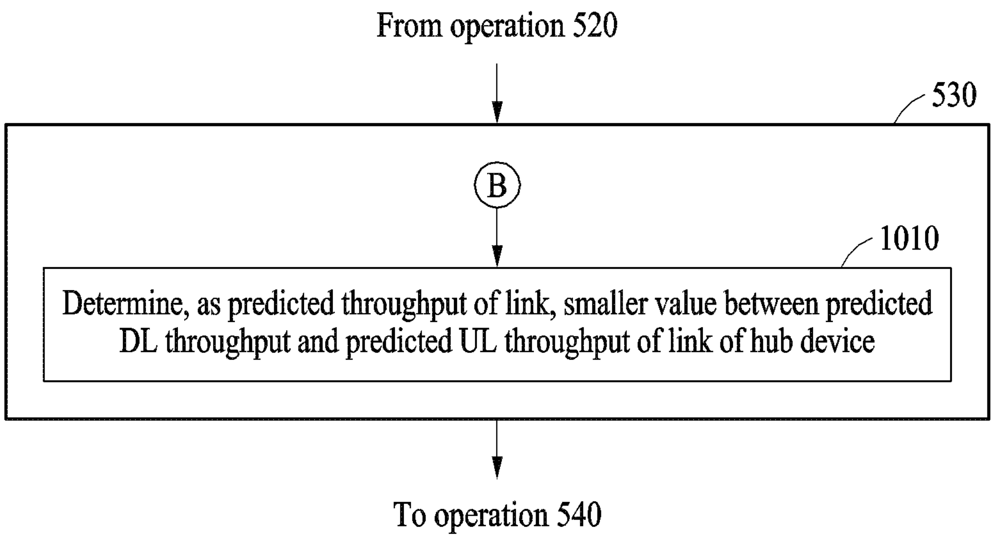
FIG. 10 is a flowchart of a method of determining a predicted throughput of a link of a hub device when the hub device does not support MLA and MLO according to an embodiment of the disclosure.

FIG. 10 is a flowchart of a method of determining a predicted throughput of a link of a hub device when the hub device does not support MLA and MLO according to an embodiment of the disclosure.

Referring to FIG. 10, according to an embodiment of the disclosure, operation 530 described above with reference to FIG. 5 may include operation 1010. Operation 1010 may be performed by an electronic device (e.g., the electronic device 101 of FIG. 1, the electronic device 200 of FIG. 2, or the STA MLD 420 of FIG. 4). For example, operation 1010 may be performed when it is determined that the hub device does not support MLO in operation 910 described above with reference to FIG. 9. In other words, when the hub device does not support MLA and MLO, operation 1010 may be performed.

In operation 1010, a processor of the electronic device may determine, as a predicted throughput of a link of the hub device, the smaller value between a predicted DL throughput and a predicted UL throughput of the link.

When the hub device includes one or more links, a predicted throughput for each of the links may be determined. For example, a predicted throughput of the sixth link of the third hub device 230 may be determined.

According to an embodiment of the disclosure, a predicted throughput of the hub device may be determined based on the predicted throughput of the link of the hub device. For example, the greatest value of predicted throughputs of links of the hub device may be determined as the predicted throughput of the hub device.

According to an embodiment of the disclosure, operation 530 may include all of operations 810, 820, 830, 840, 910, 920, 930, 940, and 1010 described above with reference to FIGS. 8 to 10. In operation 530, the processor of the electronic device may determine, as a target hub device, a hub device with the greatest predicted throughput from among one or more hub devices.

For example, when a hub device (e.g., the first hub device 210 of FIG. 2) that supports MLA is determined as the target hub device, an aggregated link of the hub device may be determined as a target link.

In another example, when a hub device (e.g., the second hub device 220 of FIG. 2) that does not support MLA but supports MLO is determined as the target hub device, one or more links of the hub device may be determined as the target link.

In yet another example, when a hub device (e.g., the third hub device 230) that does not support MLA and MLO is determined as the target hub device, one of links of the hub device may be determined as the target link.

Figure 11:
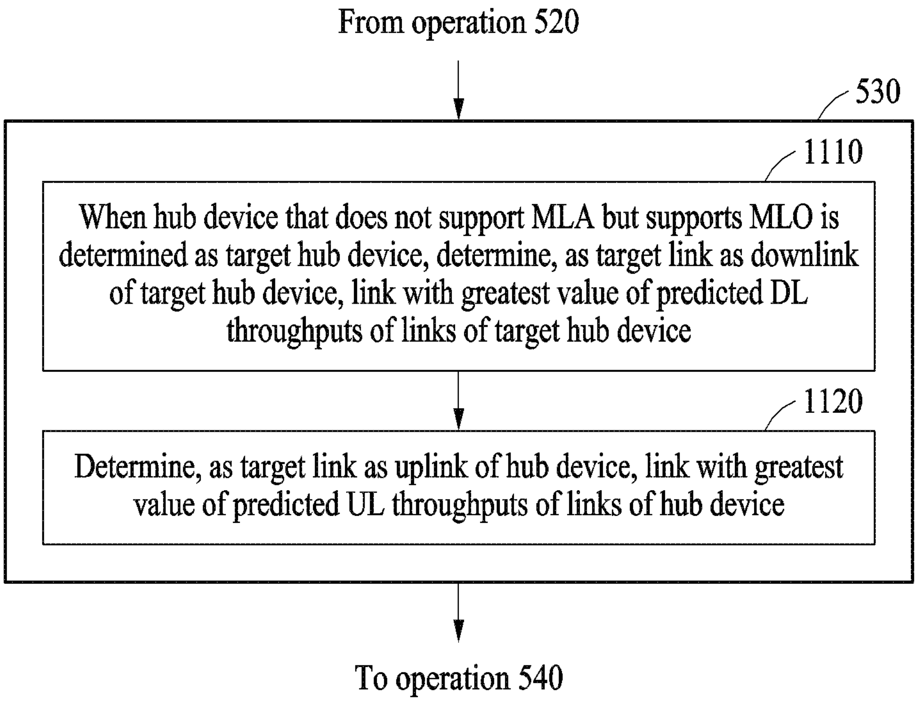
FIG. 11 is a flowchart of a method of determining a DL and a UL when a hub device that supports MLO is determined as a target hub device according to an embodiment of the disclosure.

FIG. 11 is a flowchart of a method of determining a DL and a UL when a hub device supporting MLO is determined as a target hub device according to an embodiment of the disclosure.

Referring to FIG. 11, according to an embodiment of the disclosure, operation 530 described above with reference to FIG. 5 may include operations 1110 and 1120 described below. Operations 1110 and 1120 may be performed by an electronic device (e.g., the electronic device 101 of FIG. 1, the electronic device 200 of FIG. 2, or the STA MLD 420 of FIG. 4).

In operation 1110, when a hub device (e.g., the first hub device 210 or the second hub device 220 of FIG. 2) that supports MLO is determined as a target hub device, a processor (e.g., the processor 120 of FIG. 1) of the electronic device may determine, as a target link as a DL of the target hub device, a link with the greatest value of predicted DL throughputs of links of the target hub device.

In operation 1120, the processor of the electronic device may determine, as a target link as a UL of the target hub device, a link with the greatest value of predicted UL throughputs of the links of the target hub device.

For example, when a predetermined link exhibits the greatest predicted DL throughput and predicted UL throughput compared to other links, the predetermined link may be determined as the DL and the UL.

In another example, a link determined as the DL may be different from a link determined as the UL. Links may be determined as target links such that the minimum values of the predicted throughputs of the DL and UL are maximized.

Figure 12:
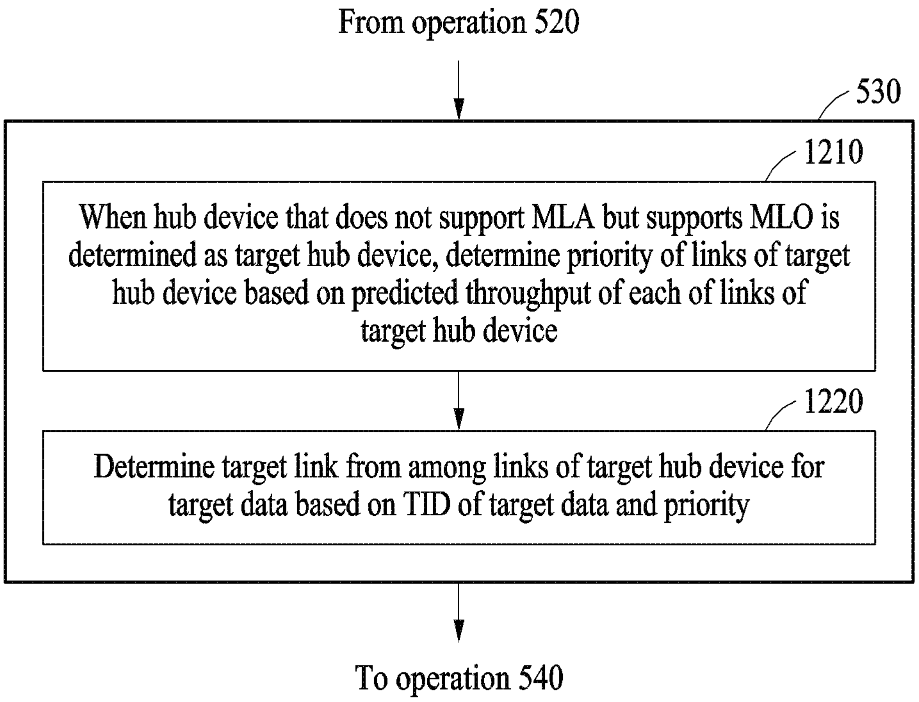
FIG. 12 is a flowchart of a method of determining a target link based on priority of links of a hub device and a traffic identifier (TID) of target data when the hub device that supports MLO is determined as a target device according to an embodiment of the disclosure.

FIG. 12 is a flowchart of a method of determining a target link based on priority of links of a hub device and a traffic identifier (TID) of target data when the hub device that supports MLO is determined as a target hub device according to an embodiment of the disclosure.

Referring to FIG. 12, according to an embodiment of the disclosure, operation 530 described above with reference to FIG. 5 may include operations 1210 and 1220 described below. Operations 1210 and 1220 may be performed by an electronic device (e.g., the electronic device 101 of FIG. 1, the electronic device 200 of FIG. 2, or the STA MLD 420 of FIG. 4).

In operation 1210, when a hub device (e.g., the first hub device 210 or the second hub device 220 of FIG. 2) that does not support MLA but supports MLO is determined as a target hub device, a processor (e.g., the processor 120 of FIG. 1) of the electronic device may determine the priority of links of the target hub device based on a predicted throughput of each of the links of the target hub device. For example, a link with a greater predicted throughput may be given higher priority.

In operation 1220, the processor of the electronic device may determine a target link from among the links of the target hub device for target data, based on a TID of the target data to be transmitted or received and the priority of the links.

According to an embodiment of the disclosure, a link with the greatest predicted throughput or an aggregated link may be allocated to first data for a first TID requiring low latency, and another link may be allocated to second data for a second TID where latency is relatively less important. For example, a method of allocating a link based on a TID may be multi-link setup using a TID-to-link mapping element defined in IEEE 802.11be or Wi-Fi 7.

Figure 13:
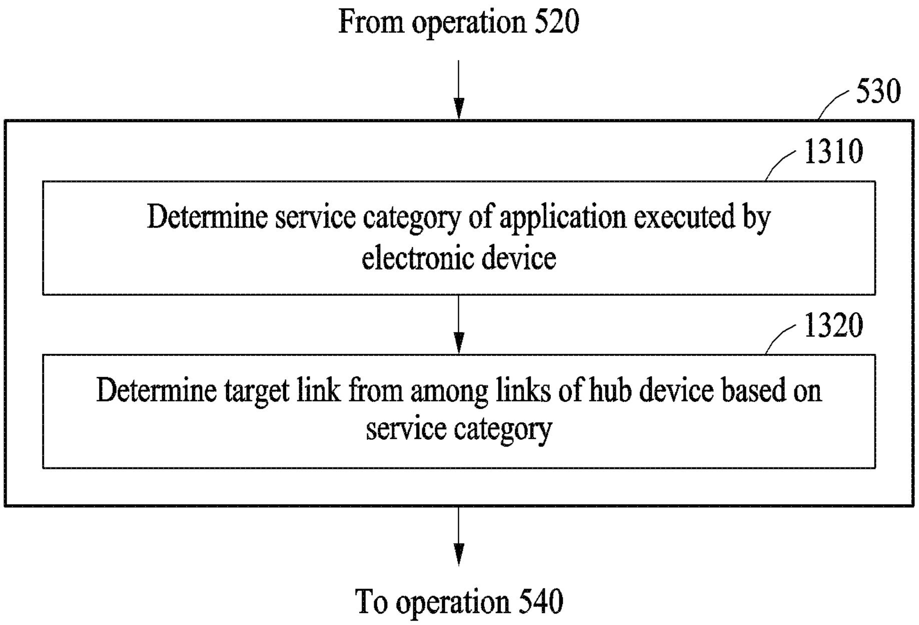
FIG. 13 is a flowchart of a method of determining a target link based on an application executed by an electronic device according to an embodiment of the disclosure.

FIG. 13 is a flowchart of a method of determining a target link based on an application executed by an electronic device according to an embodiment of the disclosure.

Referring to FIG. 13, according to an embodiment of the disclosure, operation 530 described above with reference to FIG. 5 may include operations 1310 and 1320 described below. Operations 1310 and 1320 may be performed by an electronic device (e.g., the electronic device 101 of FIG. 1, the electronic device 200 of FIG. 2, or the STA MLD 420 of FIG. 4).

In operation 1310, a processor (e.g., the processor 120 of FIG. 1) of the electronic device may determine a service category of an application executed by the electronic device. For example, the application may exchange data with an external device.

According to an embodiment of the disclosure, the requirements for transmitting and receiving data exchanged with the external device may vary depending on the service category of the application. For example, the requirements may include high-speed low-latency, high-speed high-latency, low-speed high-latency, and low-speed low-latency. For example, a real-time game application may require low latency, while an application for live streaming high-resolution videos may require high speed low latency.

In operation 1320, the processor of the electronic device may determine a target link from among links of a hub device based on the service category. The characteristic of each of the links may be represented based on a predicted DL throughput, a predicted UL throughput, and a CU value of a link. For example, the characteristic of the rate for transmitting and receiving a link may be represented by a predicted DL throughput and a predicted UL throughput. For example, the characteristic of the latency of a link may be represented by a CU value.

According to an embodiment of the disclosure, an electronic device (e.g., the electronic device 101 of FIG. 1, the electronic device 200 of FIG. 2, or the STA MLD 420 of FIG. 4) may include a communication module (e.g., the communication module 190 of FIG. 1) configured to exchange data with an external device and at least one processor (e.g., the processor 120 of FIG. 1) operatively connected to the communication module and configured to control the electronic device, wherein the processor may receive a management frame for each of one or more links transmitted by at least one hub device (e.g., the first hub device 210, the second hub device 220, or the third hub device 230 of FIG. 2) using the communication module, determine a predicted DL throughput and a predicted UL throughput for each of the links based on the management frame, determine a target link based on the determined predicted DL throughput and predicted UL throughput for each of the links, and exchange data with the external device through the target link using the communication module.

According to an embodiment of the disclosure, the one or more computer programs further include computer-executable instructions that, when executed by the one or more processors may cause the electronic device to determine a first TPC value, a first TPE value, and a first CU value based on a first management frame for a first link and determine a first predicted DL throughput and a first predicted UL throughput for the first link, based on the first TPC value, the first TPE value, and the first CU value.

According to an embodiment of the disclosure, the one or more computer programs further include computer-executable instructions that, when executed by the one or more processors may cause the electronic device to determine, as a target link, a link with the greatest sum of the predicted DL throughput and the predicted UL throughput.

According to an embodiment of the disclosure, the one or more computer programs further include computer-executable instructions that, when executed by the one or more processors may cause the electronic device to determine, as a first predicted throughput of the first link, the smaller value between the first predicted DL throughput and the first predicted UL throughput of the first link, determine, as a second predicted throughput of a second link, the smaller value between a second predicted DL throughput and a second predicted UL throughput of the second link, and determine, as a target link, a link with the greater throughput between the first predicted throughput and the second throughput.

According to an embodiment of the disclosure, when a first hub device supports MLA, an aggregation of links of the first hub device may operate as a single link of the first hub device.

According to an embodiment of the disclosure, the one or more computer programs further include computer-executable instructions that, when executed by the one or more processors may cause the electronic device to calculate, as an aggregated predicted DL throughput of the first hub device, the sum of predicted DL throughputs of the links of the first hub device, calculate, as an aggregated predicted UL throughput of the first hub device, the sum of predicted UL throughputs of the links of the first hub device, and determine, as a predicted throughput of the first hub device, a smaller value between the aggregated predicted DL throughput and the aggregated predicted UL throughput.

According to an embodiment of the disclosure, when a second hub device does not support MLA but supports MLO, the one or more computer programs further include computer-executable instructions that, when executed by the one or more processors may cause the electronic device to determine, as a predicted DL throughput of the second hub device, the greatest value of predicted DL throughputs of links of the second hub device, determine, as a predicted UL throughput of the second hub device, the greatest value of predicted UL throughputs of the links of the second hub device, and determine, as a predicted throughput of the second hub device, the smaller value between the predicted DL throughput of the second hub device and the predicted UL throughput of the second hub device.

According to an embodiment of the disclosure, when the second hub device is determined as the target link, the one or more computer programs further include computer-executable instructions that, when executed by the one or more processors may cause the electronic device to determine, as a DL of the second hub device, a link with the greatest value of predicted DL throughputs of links of the second hub device and determine, as a UL of the second hub device, a link with the greatest value of predicted UL throughputs of the links of the second hub device.

According to an embodiment of the disclosure, when the second hub device is determined as the target link, the one or more computer programs further include computer-executable instructions that, when executed by the one or more processors may cause the electronic device to determine priority of the links of the second hub device based on a predicted throughput of each of the links of the second hub device and determine the target link from among the links of the second hub device for target data, based on a TID of the target data and the priority.

According to an embodiment of the disclosure, when a third hub device does not support MLA and MLO, the one or more computer programs further include computer-executable instructions that, when executed by the one or more processors may cause the electronic device to determine, a predicted throughput of a link of the third hub device, a smaller value between a predicted DL throughput and a predicted UL throughput of a link of the third hub device.

According to an embodiment of the disclosure, the one or more computer programs further include computer-executable instructions that, when executed by the one or more processors may cause the electronic device to determine a service category of an application executed by the electronic device and determine the target link from among the links of the hub device based on the service category.

According to an embodiment of the disclosure, a method, performed by an electronic device, may include an operation (e.g., operation 510 of FIG. 5) of receiving a management frame for each of one or more links transmitted by at least one hub device, an operation (e.g., operation 520 of FIG. 5) of determining a predicted DL throughput and a predicted UL throughput for each of the links based on the management frame, an operation (e.g., operation 530 of FIG. 5) of determining a target link based on the determined predicted DL throughput and predicted UL throughput for each of the links, and an operation (e.g., operation 540 of FIG. 5) of exchanging data with an external electronic device through the target link.

According to an embodiment of the disclosure, the determining of the predicted DL throughput and the predicted UL throughput for each of the links based on the management frame may include determining a first TPC value, a first TPE value, and a first CU value based on a first management frame for a first link and determining a first predicted DL throughput and a first predicted UL throughput for the first link, based on the first TPC value, the first TPE value, and the first CU value.

According to an embodiment of the disclosure, the determining of the target link based on the determined predicted DL throughput and predicted UL throughput for each of the links may include determining, as a first predicted throughput of a first link, the smaller value between a first predicted DL throughput and a first predicted UL throughput of the first link, determining, as a second predicted throughput of a second link, the smaller value between a second predicted DL throughput and a second predicted UL throughput of the second link, and determining, as the target link, a link with the greater throughput between the first predicted throughput and the second predicted throughput.

According to an embodiment of the disclosure, the determining of the target link based on the determined predicted DL throughput and predicted UL throughput for each of the links may include, when the first hub device supports MLA, calculating, as an aggregated predicted DL throughput of the first hub device, the sum of predicted DL throughputs of links of the first hub device, calculating, as an aggregated predicted UL throughput of the first hub device, the sum of predicted UL throughputs of the links of the first hub device, and determining, as a predicted throughput of the first hub device, the smaller value between the aggregated predicted DL throughput and the aggregated predicted UL throughput, wherein the aggregation of the links of the first hub device may operate as a single link of the first hub device.

According to an embodiment of the disclosure, the determining of the target link based on the determined predicted DL throughput and predicted UL throughput for each of the links may include, when a second hub device does not support MLA but supports MLO, determining, as a predicted DL throughput of the second hub device, the greatest value of predicted DL throughputs of links of the second hub device, determining, as a predicted UL throughput of the second hub device, the greatest value of predicted UL throughputs of the links of the second hub device, and determining, as a predicted throughput of the second hub device, the smaller value between the predicted DL throughput of the second hub device and the predicted UL throughput of the second hub device.

According to an embodiment of the disclosure, the determining of the target link based on the determined predicted DL throughput and predicted UL throughput for each of the links may include, when a third hub device does not support MLA and MLO, determining, as a predicted throughput of a link of the third hub device, the smaller value between a predicted DL throughput and a predicted UL throughput of the link of the third hub device.

According to an embodiment of the disclosure, the determining of the target link based on the determined predicted DL throughput and predicted UL throughput for each of the links may include determining a service category of an application executed by the electronic device and determining the target link from among links of the hub device based on the service category.

According to an embodiment of the disclosure, an electronic device (e.g., the electronic device 101 of FIG. 1, the electronic device 200 of FIG. 2, or the STA MLD 420 of FIG. 4) may include a communication module (e.g., the communication module 190 of FIG. 1) configured to exchange data with an external device and at least one processor (e.g., the processor 120 of FIG. 1) operatively connected to the communication module and configured to control the electronic device, wherein the processor may receive a management frame for each of a plurality of links transmitted by a plurality of hub devices using the communication module, determine a predicted DL throughput and a predicted UL throughput for each of the plurality of links based on the management frame, determine a target hub device from among the plurality of hub devices based on the determined predicted DL throughput and predicted UL throughput for each of the links, and exchange data with the external device through one or more links of the target hub device.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is singular. However, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments of the disclosure, or they may be of the kind well-known and available to those having skill in the computer software arts. Examples of non-transitory computer-readable media include magnetic media, such as hard disks, floppy disks, and magnetic tape, optical media, such as CD-ROM discs and/or digital versatile discs (DVDs), magneto-optical media, such as optical discs, and hardware devices that are specially configured to store and perform program instructions, such as ROM, random access memory (RAM), flash memory, and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
- a communication module configured to exchange data with an external device;
- at least one processor; and
- memory storing instructions that, when executed by the at least one processor individually and/or collectively, cause the electronic device to:
  - receive a management frame for each of one or more links transmitted by at least one hub device using the communication module,
  - determine a first transmit power control (TPC) value, a first transmit power envelop (TPE) value, and a first channel utilization (CU) value based on a first management frame for a first link,
  - determine a predicted downlink (DL) throughput and a predicted uplink (UL) throughput for each of the links based on the first TPC value, the first TPE value, and the first CU value,
  - determine a target link based on the determined predicted DL throughput and predicted UL throughput for each of the links, and
  - exchange data with an external device through the target link using the communication module.

2. The electronic device of claim 1, wherein the instructions, when executed by the at least one processor individually or collectively, cause the electronic device to determine, as the target link, a link with a largest sum of the predicted DL throughput and the predicted UL throughput.

3. The electronic device of claim 1, wherein the instructions, when executed by the at least one processor individually or collectively, cause the electronic device to:
- determine, as a first predicted throughput of the first link, a smaller value between a first predicted DL throughput and a first predicted UL throughput of a first link,
- determine, as a second predicted throughput of a second link, a smaller value between a second predicted DL throughput and a second predicted UL throughput of a second link, and
- determine, as the target link, a link with a greater throughput between the first predicted throughput and the second predicted throughput.

4. The electronic device of claim 1, wherein, when a first hub device supports multi-link aggregation (MLA), an aggregation of links of the first hub device operates as a single link of the first hub device.

5. The electronic device of claim 4, wherein the instructions, when executed by the at least one processor individually or collectively, cause the electronic device to:
- calculate, as an aggregated predicted DL throughput of the first hub device, a sum of predicted DL throughputs of the links of the first hub device,
- calculate, as an aggregated predicted UL throughput of the first hub device, a sum of predicted UL throughputs of the links of the first hub device, and
- determine, as a predicted throughput of the first hub device, a smaller value between the aggregated predicted DL throughput and the aggregated predicted UL throughput.

6. The electronic device of claim 1, wherein the instructions, when executed by the at least one processor individually or collectively, cause the electronic device to:
- when a second hub device does not support MLA but supports multi-link operation (MLO), determine, as a predicted DL throughput of the second hub device, a greatest value of predicted DL throughputs of links of the second hub device,
- determine, as a predicted UL throughput of the second hub device, a greatest value of predicted UL throughputs of the links of the second hub device, and
- determine, as a predicted throughput of the second hub device, a smaller value between the predicted DL throughput of the second hub device and the predicted UL throughput of the second hub device.

7. The electronic device of claim 6, wherein the instructions, when executed by the at least one processor individually or collectively, cause the electronic device to:
- when the second hub device is determined as the target link, determine, as a DL of the second hub device, a link with a greatest value of the predicted DL throughputs of the links of the second hub device, and
- determine, as a UL of the second hub device, a link with a greatest value of the predicted UL throughputs of the links of the second hub device.

8. The electronic device of claim 6, wherein the instructions, when executed by the at least one processor individually or collectively, cause the electronic device to:
- when the second hub device is determined as the target link, determine priority of the links of the second hub device based on a predicted throughput of each of the links of the second hub device, and
- determine the target link from among the links of the second hub device for target data, based on a traffic identifier (TID) of the target data and the priority.

9. The electronic device of claim 1, wherein the instructions, when executed by the at least one processor individually or collectively, cause the electronic device to, when a third hub device does not support MLA and does not support MLO, determine, as a predicted throughput of a link of the third hub device, a smaller value between a predicted DL throughput and a predicted UL throughput of the link of the third hub device.

10. The electronic device of claim 1, wherein the instructions, when executed by the at least one processor individually or collectively, cause the electronic device to:
- determine a service category of an application executed by the electronic device, and
- determine the target link from among the links of the hub device based on the service category.

11. A method, performed by an electronic device, the method comprising:
- receiving a management frame for each of one or more links transmitted by at least one hub device;
- determining a predicted downlink (DL) throughput and a predicted uplink (UL) throughput for each of the links based on the management frame;

determining a target link based on the determined predicted DL throughput and the predicted UL throughput for each of the links; and exchanging data with an external electronic device through the target link, wherein the determining of the predicted DL throughput and the predicted UL throughput for each of the links based on the management frame comprises:

determining a first transmit power control (TPC) value, a first transmit power envelop (TPE) value, and a first channel utilization (CU) value based on a first management frame for a first link; and determining a first predicted DL throughput and a first predicted UL throughput for the first link, based on the first TPC value, the first TPE value, and the first CU value.

12. The method of claim 11, wherein the determining of the target link based on the determined predicted DL throughput and predicted UL throughput for each of the links comprises:

determining, as a first predicted throughput of a first link, a smaller value between a first predicted DL throughput and a first predicted UL throughput of the first link;

determining, as a second predicted throughput of a second link, a smaller value between a second predicted DL throughput and a second predicted UL throughput of the second link; and determining, as the target link, a link with a greater throughput between the first predicted through and the second throughput.

13. The method of claim 11, wherein the determining the target link based on the determined predicted DL throughput and the predicted UL throughput for each of the links comprises:

when a first hub device supports multi-link aggregation (MLA):

calculating, as an aggregated predicted DL throughput of the first hub device, a sum of predicted DL throughputs of links of the first hub device;

calculating, as an aggregated predicted UL throughput of the first hub device, a sum of predicted UL throughputs of the links of the first hub device; and determining, as a predicted throughput of the first hub device, a smaller value between the aggregated predicted DL throughput and the aggregated predicted UL throughput, wherein the aggregation of the links of the first hub device may operate as a single link of the first hub device.

14. The method of claim 11, wherein the determining of the target link based on the determined predicted DL throughput and predicted UL throughput for each of the links comprises:

when a second hub device does not support MLA but supports MLO:

determining, as a predicted DL throughput of the second hub device, the greatest value of predicted DL throughputs of links of the second hub device;

determining, as a predicted UL throughput of the second hub device, the greatest value of predicted UL throughputs of the links of the second hub device; and determining, as a predicted throughput of the second hub device, the smaller value between the predicted DL throughput of the second hub device and the predicted UL throughput of the second hub device.

15. The method of claim 11, wherein the determining of the target link based on the determined predicted DL throughput and predicted UL throughput for each of the links comprises when a third hub device does not support MLA and MLO, determining, as a predicted throughput of a link of the third hub device, the smaller value between a predicted DL throughput and a predicted UL throughput of the link of the third hub device.

16. The method of claim 11, wherein determining of the target link based on the determined predicted DL throughput and predicted UL throughput for each of the links comprises:

determining a service category of an application executed by the electronic device; and determining the target link from among links of the hub device based on the service category.

17. A non-transitory computer-readable storage medium storing instructions that, when executed by a processor, cause the processor to perform the method of claim 11.

18. An electronic device comprising:

a communication module configured to exchange data with an external device;

at least one processor; and memory storing instructions that, when executed by the at least one processor individually and/or collectively, cause the electronic device to:

receive a management frame for each of a plurality of links transmitted by a plurality of hub devices using the communication module, determine a first transmit power control (TPC) value, a first transmit power envelop (TPE) value, and a first channel utilization (CU) value based on a first management frame for a first link, determine a predicted downlink (DL) throughput and a predicted uplink (UL) throughput for each of the plurality of links based on the first TPC value, the first TPE value, and the first CU value, determine a target hub device from among the plurality of hub devices based on the determined predicted DL throughput and predicted UL throughput for each of the plurality of links, and exchange data with an external device through one or more links of the target hub device.

* * * * *